(12) United States Patent
Lamprecht et al.

(10) Patent No.: US 12,085,472 B2
(45) Date of Patent: Sep. 10, 2024

(54) COMBINATION DETECTOR FOR DETECTING VISUAL AND OPTICAL PROPERTIES OF AN OPTICAL SYSTEM AND ASSOCIATED TESTING APPARATUS FOR AN OPTICAL SYSTEM

(71) Applicant: Optocraft GmbH, Erlangen (DE)

(72) Inventors: Juergen Lamprecht, Erlangen (DE); Johannes Pfund, Erlangen (DE)

(73) Assignee: Optocraft GmbH, Erlangen (DE)

( * ) Notice: Subject to any disclaimer, the term of this patent is extended or adjusted under 35 U.S.C. 154(b) by 337 days.

(21) Appl. No.: 17/762,623

(22) PCT Filed: Sep. 21, 2020

(86) PCT No.: PCT/EP2020/076272
§ 371 (c)(1),
(2) Date: Apr. 14, 2022

(87) PCT Pub. No.: WO2021/058427
PCT Pub. Date: Apr. 1, 2021

(65) Prior Publication Data
US 2022/0334026 A1    Oct. 20, 2022

(30) Foreign Application Priority Data
Sep. 24, 2019  (DE) ..................... 10 2019 214 602.3

(51) Int. Cl.
*G01M 11/02*    (2006.01)
(52) U.S. Cl.
CPC .... *G01M 11/0207* (2013.01); *G01M 11/0257* (2013.01)
(58) Field of Classification Search
CPC ......... G01M 11/0207; G01M 11/0257; G01M 11/0271; G01M 11/02
(Continued)

(56) References Cited

U.S. PATENT DOCUMENTS

| 6,081,327 A | 6/2000 | Gaechter et al. |
| 10,234,667 B2 | 3/2019 | Novikau et al. |

(Continued)

FOREIGN PATENT DOCUMENTS

| CN | 1428597 A | 7/2003 |
| CN | 101636696 A | 1/2010 |

(Continued)

OTHER PUBLICATIONS

Chen Ke, et al., Study and experiments on extended-beacon wavefront detection for adaptive optics, Optical Technique, vol. 27 No.5 Sep. 2001, China.

*Primary Examiner* — Md M Rahman
(74) *Attorney, Agent, or Firm* — Laurence A. Greenberg; Werner H. Stemer; Ralph E. Locher (57) ABSTRACT

A combination detector for detecting a visually identifiable property and an optical property of an optical system. A phase visualization element converts an incoming light bundle to one or more output light bundles in which the spatial phase distribution of the incoming light bundle is visually apparent. The phase visualization element is arranged relative to a detection surface of an image sensor such that the output light bundle or the output light bundles is/are incident only on a first partial region of the detection surface, while a second partial region of the detection surface is exposed in the direction of incidence in order to detect the incoming light bundle which is uninfluenced by the phase visualization element. An apparatus for testing the optical system includes a light source for generating a measuring light bundle and a combination detector as described.

13 Claims, 3 Drawing Sheets

(58) Field of Classification Search
USPC .......................................................... 356/124
See application file for complete search history.

(56) References Cited

U.S. PATENT DOCUMENTS

| | | |
|---|---|---|
| 11,698,435 B2 | 7/2023 | Eberspach et al. |
| 11,774,706 B2 | 10/2023 | Stegmann et al. |
| 2009/0185132 A1 | 7/2009 | Raymond et al. |
| 2013/0200155 A1 | 8/2013 | Weber et al. |
| 2014/0028807 A1 | 1/2014 | Goulanian et al. |
| 2014/0253907 A1 | 9/2014 | Gnatovich et al. |
| 2018/0007343 A1 | 1/2018 | Send et al. |

FOREIGN PATENT DOCUMENTS

| | | |
|---|---|---|
| CN | 103225984 A | 7/2013 |
| CN | 104395818 A | 3/2015 |
| CN | 109964144 A | 7/2019 |
| CN | 110235057 A | 9/2019 |
| DE | 102014108353 A1 | 12/2014 |
| DE | 102015107367 A1 | 11/2016 |
| DE | 102015011427 A1 | 3/2017 |
| WO | 9624820 A1 | 8/1996 |

COMBINATION DETECTOR FOR DETECTING VISUAL AND OPTICAL PROPERTIES OF AN OPTICAL SYSTEM AND ASSOCIATED TESTING APPARATUS FOR AN OPTICAL SYSTEM

FIELD AND BACKGROUND OF THE INVENTION

The invention relates to a combination detector for detecting at least one visual property and at least one optical property of an optical system. The invention furthermore relates to an apparatus for testing an optical system.

Here and hereinafter, "optical system" is understood to mean, on the one hand, a single optical (i.e. influencing the propagation of light) component, in particular a refractive (light-refracting) element, e.g. a lens or an optical prism, a reflective element, e.g. a mirror or beam splitter, or a diffractive (light-diffracting) element. On the other hand, however, the "optical system" can also consist in a combination of a plurality of optical components.

In the course of the production process or during maintenance, optical systems regularly have to be checked with regard to their optical and visual properties.

In this case, "optical properties" of such an optical system are understood to mean those properties of the optical system which characterize the influence of the optical system on the propagation of light. They include—depending on the type of optical system—refractive properties such as e.g. refractive power or asphericity (e.g. "torus" or "cylinder" in the case of an astigmatic contact lens), reflective properties such as e.g. the shape of the reflective surface, the reflectance or the spectral selectivity, and/or diffractive properties such as e.g. diffraction patterns. The optical properties of an optical system furthermore include the imaging properties (point spread function, modulation transfer function, etc.) and wave aberration caused (desirably or undesirably) by the optical system. Depending on the type and complexity of the optical system, the optical properties can be present as an integral (and thus uniform for the entire optical system) variable or as a function (i.e. as a variable that varies as a function of at least one parameter, e.g. the location on the optical system, the in particular azimuthal) orientation of the optical system or the wavelength of the light influenced by the optical system). By way of example, the refractive power can be determined as an integral variable (e.g. spherical refractive power) or as a spatial refractive power distribution.

By contrast, the term "visual properties" (i.e. as visually recognizable properties) of an optical system denotes those properties of an optical system which are recognizable by eye or by an image processing method (optionally with magnification), e.g. the size (in particular the diameter), the shape, contours (such as e.g. an outer edge), the position (in particular centering in relation to an optical axis) and the orientation (alignment), a geometric center, possible macroscopic defects or damage, two-dimensional or three-dimensional (e.g. milled or etched) markings, in particular letters, etc.

While visual properties of an optical system can be tested or analyzed either by the optical system to be tested being observed by eye (optionally through a magnifying glass or a microscope) or by automatic processing of a photographic image of the optical system, optical properties of an optical system are generally not straightforwardly visually recognizable or characterizable.

Rather, wavefront detectors or interferometers are frequently used for determining or testing optical properties. Such detectors are configured to make the spatial phase distribution (wavefront) of a light beam influenced by the optical system to be tested visually recognizable and to detect it.

Conventional testing apparatuses such as are used for example for testing contact lenses or intraocular lenses regularly also have a photographic camera in addition to such a wavefront detector. Besides recognizing defects and damage, the camera also makes it possible to determine the position and orientation of the optical system to be tested in the testing apparatus. This is of elementary importance for testing the optical properties, too, since it is necessary to determine or check many optical properties in regard to the geometry of the optical system (e.g. the geometric center, axes or an edge of the optical system), such that these optical properties can only be determined or checked in the first place or at least with sufficient accuracy if the position and orientation of the optical system are known in the testing apparatus.

In order to be able to examine an optical system to be tested both by means of the wavefront detector or interferometer and by means of the camera, without the optical system and the detectors (incl. the camera) having to be moved relative to one another, in conventional testing apparatuses a measurement light beam influenced by the optical system is often split into two partial light beams by means of a beam splitter, these partial light beams being forwarded to the wavefront detector or interferometer and the camera. Testing apparatuses of this type are comparatively large and complex. They are thus also associated with a correspondingly high outlay for production. Moreover, they are often firstly difficult to align and secondly susceptible to (e.g. vibration-dictated) misalignments. Such misalignments are sometimes not clearly discernible and can therefore result in unnoticed measurement errors.

SUMMARY OF THE INVENTION

The invention is based on the object of enabling optical systems to be tested simply and in a manner insusceptible to errors.

This object is achieved according to the invention by means of a combination detector having the features as claimed for detecting at least one visual property and at least one optical property of an optical system. The above object is furthermore achieved according to the invention by means of an apparatus having the features as claimed for testing an optical system. Configurations and further developments that are advantageous and in part inventive in themselves are set out in the dependent claims and the following description.

Firstly, the combination detector comprises an image sensor having a detection surface (aperture). Secondly, the combination detector comprises a phase visualization element configured to convert an input light beam impinging from a direction of incidence into one or more output light beams, in which the spatial phase distribution (also referred to equivalently as "wavefront") of the input light beam is directly or indirectly visually recognizable. The detection surface of the image sensor here is subdivided functionally and/or structurally into (at least) two partial regions (detection regions): according to the invention, the phase visualization element is arranged relative to the detection surface of the image sensor in such a way that the output light beam or the output light beams is/are incident only on a first partial region of the detection surface, while a second partial region of the detection surface is exposed toward the direction of incidence in order to detect the input light beam which is uninfluenced by the phase visualization element. The second partial region is preferably arranged directly in the beam path of the input light beam; at most beam-deflecting or imaging optical systems or transparent media which do not irreversibly alter the visual information of the input light beam are disposed upstream of the second partial region in this case. Alternatively, a filter is disposed upstream of the second partial region. Here and hereinafter, "filter" denotes an optical element which selects incident light according to specific criteria (e.g. wavelength or polarization), e.g. a color or polarization filter, but which in this case—in contrast to the phase visualization element—does not make the spatial phase distribution of the input light beam visually visible.

For the purpose of detecting the at least one visual property and the at least one optical property, the combination detector is arranged in relation to an optical system to be analyzed in such a way that a light beam influenced by the optical system, as input light beam, is incident on the phase visualization element and the second partial region of the detection surface. In this case, a (total) image of the optical system to be analyzed is recorded by means of the image sensor, which image—in accordance with the division of the detection surface of the image sensor—is subdivided into a first image region corresponding to the first partial region and a second image region corresponding to the second partial region. In this case, the phase visualization element and the first partial region of the detection surface together form a wavefront detector for detecting the at least one optical property of the optical system, wherein this at least one optical property is determinable from the first image region. By means of the second partial region of the detection surface, at least one part of the optical system is photographically imaged, i.e. photochemically or electronically converted into information that is evaluable by means of image processing technology. In this case, the corresponding second image region (not influenced by the phase visualization element) contains the information about the at least one visual property of the optical system.

The combination detector described above allows optical systems to be tested simply and in a manner insusceptible to errors. In particular, the combination detector—in comparison with conventional devices or device combinations having a comparable functional scope—can be produced particularly compactly. A beam splitter such as is present in conventional testing apparatuses is not required for the combination detector and is therefore preferably not provided either. The input light beam to be examined is in particular not replicated into a plurality of identical light beams for the determination of the visual and optical properties of the optical system to be tested. Rather, different parts of the input light beam are analyzed with regard to the optical and visually recognizable properties of the optical system to be tested.

In one simple embodiment of the invention, the first partial region and the second partial region completely fill the detection surface. In alternative embodiments of the invention, however, the detection surface can also be subdivided into more than two partial regions. It can comprise "a plurality of first partial regions", for example, upstream of each of which a phase visualization element is disposed. Additionally or alternatively, the detection surface can also have for example "a plurality of second partial regions" without an upstream phase visualization element, e.g. one partial region with an upstream filter and another partial region with a different filter or without an upstream filter.

The first partial region and the second partial region of the detection surface are preferably arranged concentrically with respect to one another. In this case, therefore, one of the partial regions, in particular the first partial region, is arranged within the other, in particular the second partial region. Alternatively, however, the partial regions can also be arranged in some other way, e.g. next to one another, within the scope of the invention.

In one expedient embodiment of the invention, the phase visualization element comprises a one- or two-dimensional microlens array, e.g. a microlens array such as is used per se in a conventional Shack-Hartmann detector. In alternative embodiments of the invention, the phase visualization element comprises a perforated plate (e.g. corresponding to the perforated plate of a conventional Hartmann detector), an interference grating (e.g. corresponding to the interference grating of a conventional Talbot detector) or a shearing interferometer. In principle, furthermore, the use of a different wavefront sensor or interferometer, e.g. a Michelson interferometer, as phase visualization element is also conceivable within the scope of the invention.

Preferably, the phase visualization element is fixed, in particular screwed, clamped or adhesively bonded, directly (i.e. without interposed optical components) in front of or on the detection surface of the image sensor. In this case, the image sensor and the phase visualization element form in particular a fixedly interlinked structural unit, such that a self-acting misalignment of the phase visualization element in relation to the detection surface (e.g. as a result of vibrations, etc.) can be at least largely excluded.

The use of a photographic plate or a photographic film as image sensor is conceivable, in principle, within the scope of the invention. An electronic image sensor is preferably used, however. The latter is formed by a CCD or CMOS chip in an expedient embodiment of the invention. Alternatively, the image sensor is realized by a photodiode array, for example. In general, the electronic image sensor has a two-dimensional spatial resolution, that is to say has in each case a plurality of pixel rows and pixel columns. However, embodiments in which the image sensor is one-dimensional (that is to say has only a single pixel row) are also within the scope of the invention. In this case, the detection surface of the image sensor has only the width of one pixel. Such a one-dimensional image sensor can be arranged in a stationary manner within the scope of the invention if two-dimensional image or phase information is not required. Alternatively, the image sensor—with the phase visualization element or without the phase visualization element—is rotated or displaced transversely with respect to the direction of incidence of the input light beam, such that a surface exceeding the detection surface is scanned by means of the image sensor.

The apparatus for testing the optical system (hereinafter for short: testing apparatus) according to the invention comprises a light source for generating a measurement light beam and also the above-described combination detector according to the invention, in particular in one of the embodiment variants described above. In the context of the testing apparatus, the combination detector is arranged relative to the light source in particular in such a way that light which is transmitted or reflected by the optical system arranged in the beam path of the measurement light beam for test purposes is incident as an input light beam on the combination detector.

Preferably, the testing apparatus additionally comprises a sample holder for fixing the optical system to be tested, said sample holder being arranged in a beam path of the measurement light beam between the light source and the combination detector.

Preferably, an imaging optical system, e.g. a Kepler telescope (also referred to as "relay lens"), is interposed between the optical system to be tested and the phase visualization element and/or the second partial region of the detection surface, such that a sharp image of the optical system to be tested is generated on the phase visualization element and/or the second partial region of the detection surface. In this case, within the scope of the invention, the imaging optical system can be embodied as part of the combination detector (and thus form together with the other components of the combination detector an interlinked structural unit) or as part of the apparatus that is detached from the combination detector. Alternatively, the image of the optical system to be tested is projected onto the phase visualization element and the second partial region of the detection surface without an interposed imaging optical system.

Furthermore, provision is preferably made of an optical element for matching the optical path lengths of that part of the input light beam which impinges on the phase visualization element and that part of the input light beam which impinges on the second partial region of the detection surface. This optical element compensates for the geometric distance between the phase visualization element and the detection surface. It is therefore also referred to hereinafter as a "compensation element". The compensation element is formed by a glass plate, for example, which is disposed upstream of only the second partial region of the detection surface, but not the phase visualization element, or which has a greater thickness in a region corresponding to the second partial region of the detection surface than in the region of the phase visualization element. As yet another alternative, the compensation element is formed by a refractive element which has a higher refractive index in a region corresponding to the second partial region of the detection surface than in the region of the phase visualization element. In embodiments of the invention in which an imaging optical system is disposed upstream of the image sensor and the phase visualization element, the compensation element is designed in particular in such a way that the optical system to be tested is sharply imaged by the imaging optical system both onto the phase visualization element and onto the second partial region of the detection surface. Within the scope of the invention, the compensation element, too, can be embodied as part of the combination detector (and thus form together with the other components of the combination detector an interlinked structural unit) or as part of the apparatus that is detached from the combination detector.

Furthermore, in one advantageous embodiment, the apparatus comprises an evaluation unit for evaluating an image of the optical system to be tested, said image being recorded by the image sensor and having—as described above—a first image region corresponding to the first partial region of the detection surface and a second image region corresponding to the second partial region of the detection surface. The evaluation unit is designed to automatically ascertain at least one optical property of the optical system to be tested (in particular one of the optical properties mentioned in the introduction) from the first image region. Additionally or alternatively, the evaluation unit is designed to automatically ascertain at least one visual property (in particular one of the visual properties mentioned in the introduction) of the optical system to be tested from the second image region.

The evaluation unit is preferably formed by a programmable device, in particular a computer or microcontroller, in which the functionality for determining the at least one optical or visual property is implemented in the form of a program. As an alternative thereto, however, within the scope of the invention, the evaluation unit can also be formed by a non-programmable device (e.g. in the form of an ASIC), in which the functionality described above is realized in terms of circuitry (i.e. by hardware). As yet another alternative, within the scope of the invention, the evaluation unit can be formed by a combination of programmable and non-programmable components, e.g. a microcontroller with a control program implemented therein and an ASIC.

For the purpose of automatic evaluation, the first image region and/or the second image region are/is preferably extracted automatically from the total image recorded by the image sensor. In simple but expedient embodiments of the invention, this extraction is effected in accordance with a predefinition that is fixed (i.e. unaltered during normal operation of the testing apparatus), e.g. by the signals of the pixel groups of the image sensor that correspond to the first and/or second image region being stored, by means of a corresponding (hardware) interconnection, in two different data sets corresponding to the first and/or second image region, or by the image being divided into two partial images corresponding to the first and/or second image region according to an invariable mask by means of electronic image processing.

In a departure therefrom, in one advantageous variant of the invention, the evaluation unit is designed to automatically recognize and segment the first image region and/or the second image region, in particular by means of electronic pattern recognition, in the total image recorded by the image sensor. This allows a particularly precise evaluation of the first and/or second image region in applications in which—e.g. on account of greatly deviating properties of different optical systems to be tested—the direction of incidence and/or focusing of the input light beam and thus the position and/or size of the first and second image regions vary significantly from test process to test process.

The combination detector according to the invention and the associated testing apparatus can be used in principle for analyzing and testing arbitrary optical systems (in particular the optical systems mentioned in the introduction). In one preferred use, however, the combination detector and the testing apparatus equipped therewith are used for testing lenses, in particular contact lenses or intraocular lenses. Moreover, the use of the combination detector and of the testing apparatus equipped therewith for testing aspherical lenses, e.g. for industrial applications, is also particularly advantageous.

In the applications described above, preferably refractive properties, in particular the refractive power, a spatially resolved refractive force distribution and/or the asphericity (e.g. "torus" or "cylinder"), are determined as optical properties.

Compared with conventional testing apparatuses comprising a wavefront detector and a photographic camera separate therefrom, the combination detector according to the invention and the associated testing apparatus have the advantage that a light detector is saved. The testing apparatus according to the invention can therefore be realized particularly compactly and with comparatively low outlay. In particular, in the case of the solution according to the invention, splitting of the light influenced by the optical system to be tested is not necessary and is therefore preferably not provided either. Moreover, owing to the integration of the two detection regions on the continuous detection surface of the image sensor, the alignment of the optical components of the combination detector according to the invention and of the associated testing apparatus is significantly simplified. A possible misalignment is easy to recognize.

One embodiment of the invention is furthermore a method for detecting at least one visually recognizable property and at least one optical property of an optical system. In accordance with the method, a first partial image is generated by means of an image sensor and an upstream phase visualization element, in which first partial image a spatial phase distribution of a measurement light beam influenced by the optical system to be tested is made visually recognizable. A second partial image containing an imaging or projection of a part of the optical system to be tested is generated by means of the image sensor. The at least one optical property is ascertained from the first partial image while the at least one visually recognizable property is ascertained from the second partial image. The method according to the invention differs from conventional testing methods in particular in that the same image sensor is used for generating the first partial image and the second partial image. The method is preferably carried out by means of the apparatus described above or the combination detector described above. As an alternative thereto, the image sensor, for recording the first partial image and the second partial image, is moved between a first position, in which its detection surface is covered by the phase visualization element, and a second position, in which the detection surface is exposed toward the direction of incidence in order to detect the input light beam which is uninfluenced by the phase visualization element.

One exemplary embodiment of the invention is explained in greater detail below with reference to a drawing, in which:

DETAILED DESCRIPTION OF THE INVENTION

Mutually corresponding parts and structures are always provided with identical reference signs in all of the figures.

Figure 1:
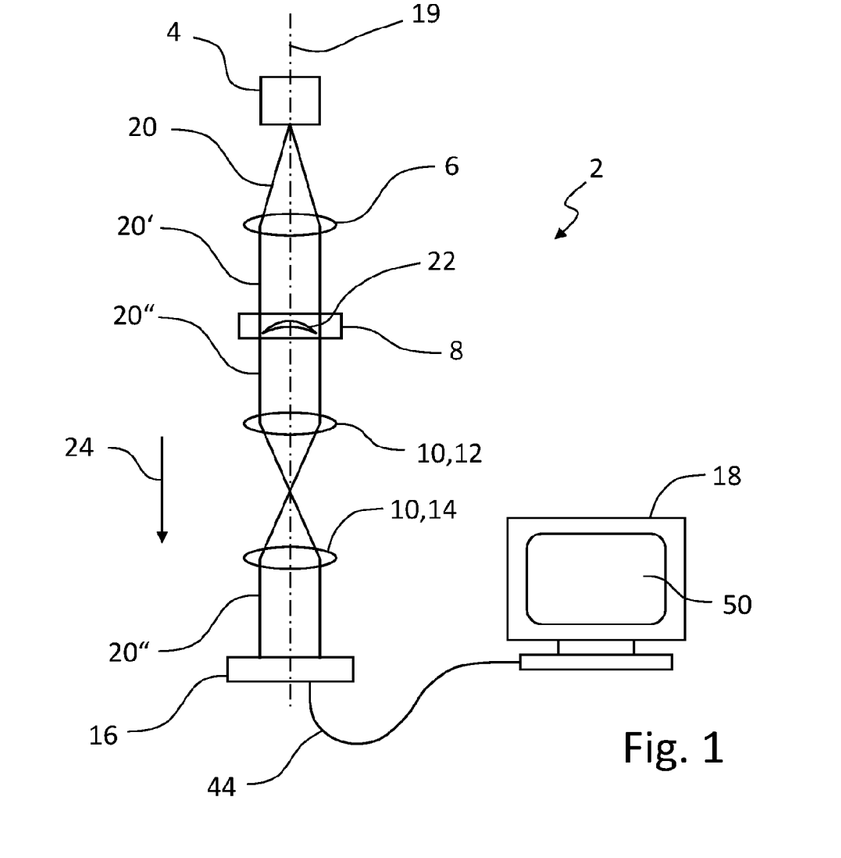
FIG. 1 shows, in a schematic illustration, an apparatus for testing contact lenses comprising a light source for generating a measurement light beam, comprising a sample holder for fixing a contact lens to be tested, said sample holder being arranged in the beam path of the measurement light beam, comprising a combination detector for detecting visual and optical properties of the contact lens, and comprising an evaluation unit in the form of a computer for evaluating an image of the contact lens, said image being recorded by the combination detector and containing the information about the visual and optical properties of the contact lens.

The testing apparatus 2 shown in a roughly schematic illustration in FIG. 1 serves for testing contact lenses.

The apparatus 2 comprises a (point) light source 4, a collimator 6, a sample holder 8, a Kepler telescope 10 (relay lens) comprising two lenses 12 and 14, a combination detector 16 and an evaluation unit 18. The light source 4, the collimator 6, the sample holder 8, the lenses 12, 14 of the Kepler telescope 10 and the combination detector 16 are disposed one downstream of the another along an optical axis 19.

The light source 4 is formed for example by the end of an LED-supplied optical fiber and generates a measurement light beam 20. The initially divergent measurement light beam 20 is aligned parallel by the collimator 6. The parallelized measurement light beam 20' is then incident on the sample holder 8, in which, in the example illustrated, a contact lens 22 to be tested is positioned. The contact lens 22 to be tested is for example a soft contact lens. In this case, the sample holder 8 comprises a liquid-filled cuvette that accommodates the contact lens 22. Alternatively, the testing apparatus 2 is used for testing hard contact lenses. In this case, the sample holder 8 preferably comprises a transparent support, on which the contact lenses to be tested are positioned in air.

The measurement light beam 20" transmitted through the sample holder 8 and in the process influenced by the contact lens 22 to be tested passes through the lenses 12 and 14 of the Kepler telescope 10 before being incident on the combination detector 16 as an input light beam in a direction 24 of light incidence. In this case, the contact lens 22 is imaged onto the combination detector 16.

Figure 2:
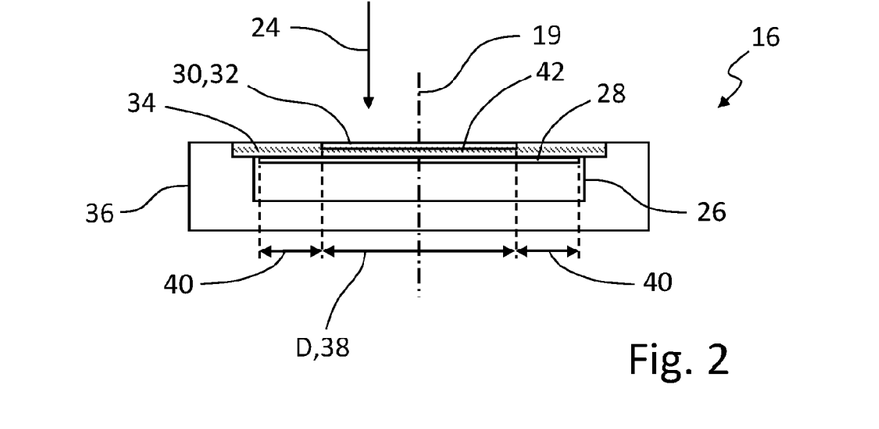
FIG. 2 shows, in a schematic sectional illustration, the combination detector of the apparatus in accordance with FIG. 1.
Figure 3:
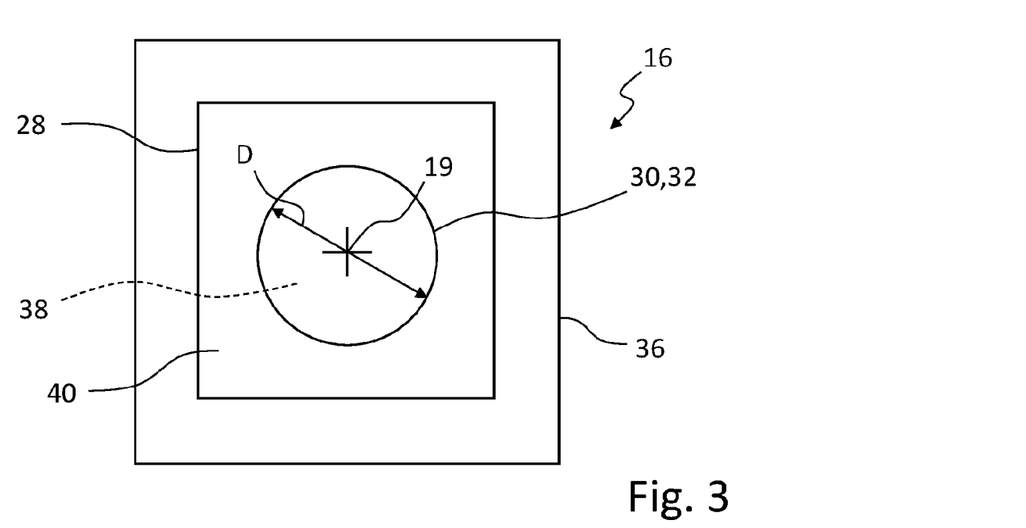
FIG. 3 shows, in a schematic plan view, the combination detector in accordance with FIG. 2.

The combination detector 16, depicted in greater detail in FIGS. 2 and 3, comprises an image sensor 26, which here is formed by a CCD chip, having a detection surface 28. The combination detector 16 furthermore comprises a phase visualization element 30 disposed—as viewed in the direction 24 of incidence—upstream of the detection surface 28 of the image sensor 26 (to put it more precisely a part of the detection surface 28). In the example illustrated, the phase visualization element 30 is a two-dimensional microlens array 32 (that is to say a two-dimensional arrangement of lenses with a typical diameter of between 50 micrometers and 1000 micrometers, in particular 150 micrometers), which was introduced into a glass plate 34 by means of an etching process, for example.

The glass plate 34 with the microlens array 32 is applied—preferably by screwing or clamping—directly (i.e. without interposed optical components) on the image sensor 26, wherein a distance of typically between 0.5 millimeter and 30 millimeters is formed between the microlens array 32 and the detection surface 28. In the exemplary embodiment illustrated here, the image sensor 26 and the glass plate 34 with the microlens array 32 are held in a housing 36 of the combination detector 16 in such a way that they are fixed in an immovable (and in particular also vibration-resistant) relative position with respect to one another.

As is evident from FIGS. 2 and 3, the microlens array 32 has a circular outer contour having a diameter D that is less than the extent of the—here by way of example square—detection surface 28. The microlens array 32 is arranged here in a manner centered in relation to the detection surface 28.

By virtue of the microlens array 32 being smaller in comparison with the detection surface 28, the detection surface 28 is subdivided into two parts, namely into a circular first partial region 38, which overlaps the microlens array 32 as viewed in the direction 24 of light incidence, and also a ring-shaped second partial region 40 (here having a square outer contour corresponding to the outer contour of the detection surface 28) which occupies the remaining part of the detection surface 28. The partial regions 38 and 40 of the detection surface 28 are arranged concentrically with respect to one another in this case.

The microlens array 32 is disposed upstream of the first partial region 38 in the direction 24 of light incidence, with the result that the light incident on the partial region 38 has to be transmitted by the microlens array 32. In this case, the microlens array 32 interacts with the partial region 38 of the detection surface 28 to form a Shack-Hartmann wavefront detector: in accordance with the functional principle that is typical of a Shack-Hartmann wavefront detector, the measurement light beam 20″ incident as input light beam on the microlens array 32 is converted by the microlens array 32 into a multiplicity of output light beams 42 which, by virtue of their direction of propagation, include information about the spatial phase distribution (wavefront) of the incident measurement light beam 20″. The output light beams 42 are detected by the image sensor 26 as discrete points of light within the first partial region 38 of the detection surface 28. From the position of these points of light, the local direction of propagation and thus the spatial phase distribution of the incident measurement light beam 20″ are determinable in this case. The optical properties of the contact lens 22 to be tested can in turn be determined therefrom.

The microlens array 32 is not disposed upstream of the second partial region 40 of the detection surface 28. The measurement light beam 20″ incident as input light beam is therefore not influenced by the microlens array 32 in the second partial region 40. Rather, an image representation of a part of the contact lens 22 to be tested is recorded in the second partial region 40.

Figure 4:
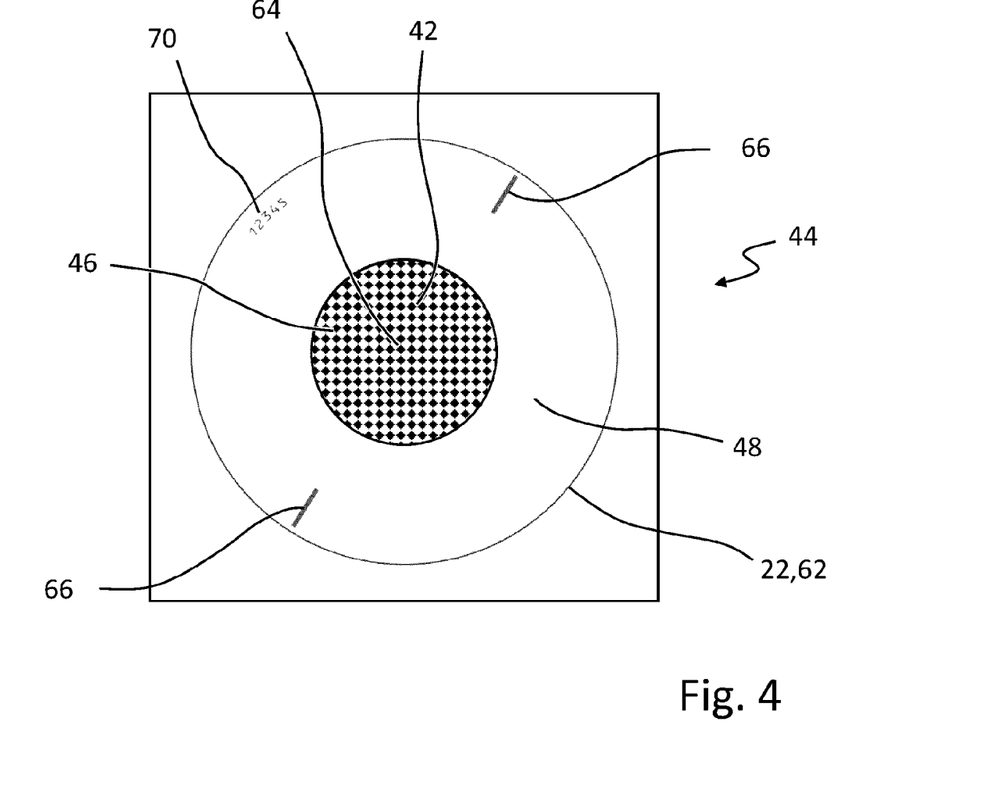
FIG. 4 shows, in a schematic illustration, an image of a contact lens recorded by means of the combination detector.

The image sensor 26 generates a (total) image 44—according to the brightness distribution detected over the entire detection surface 28—and feeds this image 44 in the form of an image data set to the evaluation unit 18. One example of the total image 44 is illustrated in FIG. 4. It is evident therefrom that the total image 44, just like the detection surface 28, is subdivided into two parts, namely into a first image region 46 corresponding to the first partial region 38 of the detection surface 28 and into a second image region 48 corresponding to the second partial region 40 of the detection surface 28. The output light beams 42 generated by the microlens array 32 are thus discernible as a point pattern in the first image region 46. By contrast, the second image region 48 contains an image representation of the contact lens 22 to be tested, to put it more precisely of an edge region of the contact lens 22.

The dimensioning and arrangement of the microlens array 32 in relation to the detection surface 28 were effected taking account of the fact that the optical zone relevant to the optical properties of contact lenses regularly only occupies a central region of the entire lens surface. The entire contact lens 22 typically has a geometric diameter of approximately 10 millimeters to 21 millimeters, typically 14 millimeters, while the optical zone occupies a diameter of approximately 8 millimeters. In this case, the optical zone of the contact lens 22 is imaged onto the microlens array 32 of the combination detector 16, while an edge of the contact lens 22 surrounding the optical zone is imaged onto the second partial region 40 of the detection surface 28.

The evaluation unit 18 is preferably formed by a computer, for example a personal computer, in which evaluation software 50 is installed. One exemplary structure of the evaluation software 50 is shown in a roughly simplified illustration in FIG. 5. Accordingly, the evaluation software 50 comprises a segmentation module 52, an optical evaluation module 54 and an image recognition module 56.

Figure 5:
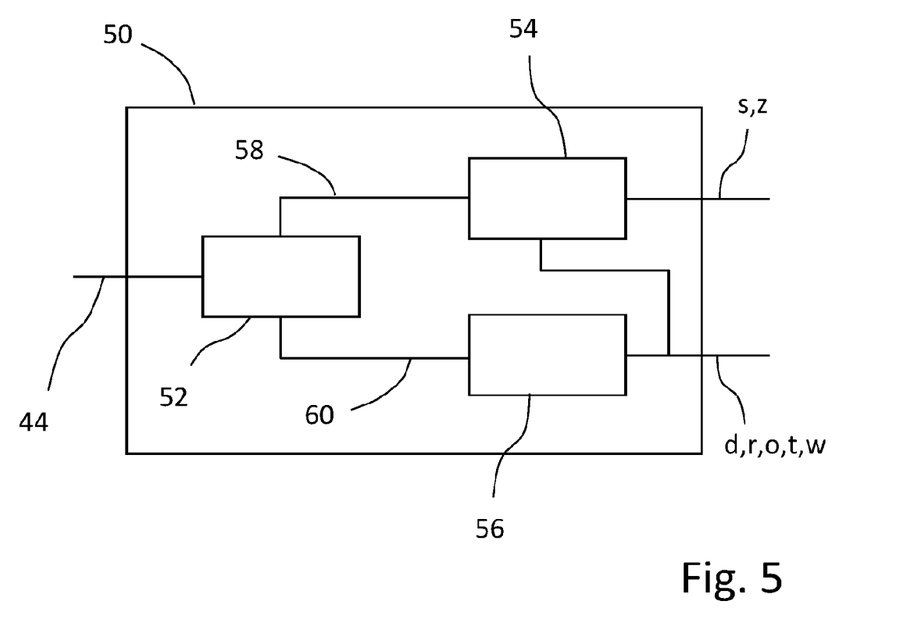
FIG. 5 shows, in a schematic block diagram, the structure of evaluation software implemented in the evaluation unit.

By means of the segmentation module 52, the image regions 46 and 48 in the total image 44 are recognized using automatic pattern recognition and segmented. The image information respectively corresponding to the image regions 46 and 48 is thus separated from one another (i.e. cut out by way of image processing technology) in order to be further processed separately in separate partial images 58 and 60. As alternative thereto, the segmentation module 52 separates the image regions 46 and 48 according to a predefined mask. In this case, predefined complementary pixel groups of the total image 44 are allocated to the partial image 58 and respectively the partial image 60. The partial image 58 including the first image region 46 is fed to the optical evaluation module 54, while the partial image 60 including the second image region 48 is fed to the image recognition module 56.

The image recognition module 56 identifies in the partial image 60 (and thus in the image region 48 of the image 44 recorded by the image sensor 26), by means of automatic pattern recognition, the following visually recognizable properties of the contact lens 22 to be tested:

- an outer contour 62 of the contact lens 22; on the basis of the identified outer contour 62, the image recognition module 56 calculates the diameter d of the contact lens 22 and also the position r of a geometric center 64 of the contact lens 22 (i.e. of the center point of the circular outer contour);
- two- or three-dimensional markings on the contact lens 22; markings 66 in the form of two lines diametrically opposite one another on both sides of the optical center 64 of the contact lens 22 are discernible by way of example in FIG. 4 and are used here as an aid for inserting the contact lens 22 in the intended azimuthal orientation (the contact lens 22, which here by way of example is toric, and thus aspherical, must be inserted into the wearer's eye for example in such a way that the markings are oriented vertically); the image recognition module 56 recognizes the markings 66 and determines therefrom the (azimuthal) orientation o of the contact lens 22 in the testing apparatus 2;
- possible inscriptions 70 on the contact lens 22, e.g. product name, serial number, design values (in particular target values for optical variables such as refractive power, torus, etc.); and
- possible defects of the contact lens 22; by means of the image recognition module 56, for example, recognized structures within the recognized outer contour 62 which exceed a predefined minimum size and cannot be identified either as a marking or as an inscription are identified as defects.

In alternative embodiments, the image recognition module 56 is designed to recognize QR codes or other codes and/or possible distinctive features of the outer shape (e.g. deviations from a circular outer contour).

The image recognition module 56 outputs the visual properties ascertained, that is to say in particular the diameter d and the position r of the geometric center 64, the orientation o of the contact lens 22 as indicated by the markings 66, possible recognized text t and optionally a warning indication w in respect of possible defects recognized. If required, at least a portion of this information (in particular the position r of the geometric center 64 and the orientation o of the contact lens 22) is additionally fed to the optical evaluation module 54 as well.

The optical evaluation module 54 determines the wavefront from the point pattern of the partial image 58 (and thus of the image region 46 of the image recorded by the image sensor 26) in the usual way in the case of a Shack-Hartmann sensor. The evaluation module 54 calculates therefrom the following optical properties of the contact lens 22 to be tested:

the spherical refractive power s of the contact lens 22 in the case of astigmatic contact lenses (as depicted in FIG. 4) the cylindrical refractive power z of the contact lens 22, i.e. the difference between the refractive powers in different directions and the orientation of the preferred axes (the orientation of the preferred axes is preferably specified as an angular difference with respect to the orientation o indicated by the markings 66).

In alternatives embodiments, the evaluation module 54 additionally or alternatively determines the prismatic refractive power, the wave aberration and/or the spatially resolved refractive power distribution.

The evaluation module 54 outputs the optical properties ascertained, in particular the spherical refractive power s and the cylindrical refractive power z.

In an alternative embodiment, the apparatus 2 is used for testing aspherical lenses, in particular (non-rotationally symmetrical) freeform lenses. In contrast to the embodiment described above, the optical evaluation module 54 here determines a two-dimensionally spatially resolved spatial refractive power distribution over the surface of the tested lens, instead of the spherical refractive power s and the cylindrical refractive power z. The evaluation module 54 relates this spatial refractive power distribution to the position r of the geometric center 64 and/or the orientation o.

Figure 6:
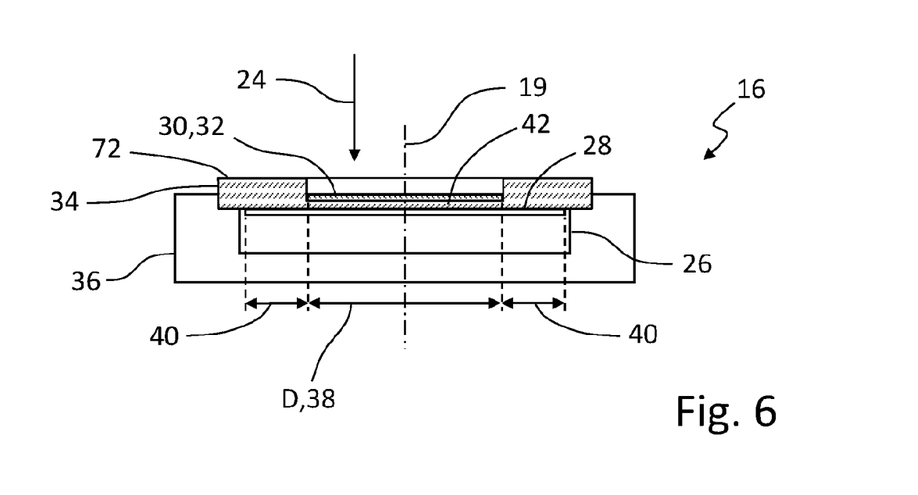
FIG. 6 shows, in an illustration in accordance with FIG. 2, an alternative embodiment of the combination detector.

FIG. 6 shows another embodiment of the combination detector 16, this embodiment being used as an alternative to the embodiment described above in the apparatus 2. The combination detector 16 in accordance with FIG. 6, insofar as not described differently below, corresponds to the embodiment described above. It differs from the latter, however, in that the glass plate 34 has a larger thickness in a ring region 72 surrounding the microlens array 32 than in the region occupied by the microlens array 32. The thickened ring region 72 here acts as a compensation element, by means of which the optical path lengths of the outer part of the measurement light beam 20", said outer part impinging on the partial region 40 of the detection surface 28, and of the inner part of the measurement light beam 20", said inner part impinging on the microlens array 32, are matched to one another. As a result, the measurement light beam 20" is sharply imaged by the Kepler telescope 10 both onto the partial region 40 of the detection surface 28 and onto the microlens array 32. In other words, the thickened ring region 72 compensates for the geometric distance between the microlens array 32 and the detection surface 28. Instead of the thickened ring region 72 of the glass plate 34, it is also possible to use a compensation element detached from the glass plate 34, for example in the form of a separate glass ring. Such a compensation element can be embodied as part of the combination detector 16 or as a component detached therefrom in the apparatus 2.

The claimed invention becomes particularly clear from the exemplary embodiments described above, but is not restricted to these exemplary embodiments. Rather, further embodiments of the invention can be derived from the claims and the description above.

LIST OF REFERENCE SIGNS 2 (Testing) apparatus
4 (Point) light source
6 Collimator
8 Sample holder
10 Relay optical system
12 Lens
14 Lens
16 Combination detector
18 Evaluation unit
19 (Optical) axis
20, 20', 20" Measurement light beam
22 Contact lens
24 Direction of incidence
26 Image sensor
28 Detection surface
30 Phase visualization element
32 Microlens array
34 Glass plate
36 Housing
38 (First) partial region
40 (Second) partial region
42 Output light beam
44 Total image
46 (First) image region
48 (Second) image region
50 Evaluation software
52 Segmentation module
54 (Optical) evaluation module
56 Image recognition module
58 Partial image
60 Partial image
62 Outer contour
64 (Geometric) center
66 Marking
70 Inscription
72 Ring region
s (Spherical) refractive power
d Diameter (of the contact lens)
D Diameter (of the lens array)
w Warning indication (in respect of defects of the contact lens)
Orientation (of the contact lens)
r Position (of the geometric center of the contact lens)
t Text
z (Cylindrical) refractive power

The invention claimed is:

1. A combination detector for detecting at least one visually recognizable property and at least one optical property of an optical system, the combination detector comprising:
an image sensor having a detection surface with a first partial region and a second partial region;
a phase visualization element configured to convert an input light beam impinging from a direction of incidence into one or more output light beams in which a spatial phase distribution of the input light beam is visually visible;
said phase visualization element being arranged relative to said detection surface of said image sensor in such a way that the one or more output light beams are incident only on said first partial region of said detection surface, while said second partial region of said detection surface is exposed toward the direction of incidence in order to detect the input light beam that is uninfluenced by said phase visualization element.

2. The combination detector according to claim 1, wherein said phase visualization element is selected from the group consisting of a microlens array, a perforated plate, an interference grating, and a shearing interferometer.

3. The combination detector according to claim 1, wherein said first partial region and said second partial region are arranged concentrically with respect to one another.

4. The combination detector according to claim 1, wherein said phase visualization element is fixed directly in front of or on the detection surface of the image sensor.

5. The combination detector according to claim 4, wherein said phase visualization element is screwed, clamped, or adhesively bonded.

6. The combination detector according to claim 1, wherein said image sensor is a CCD chip or a photodiode array.

7. An apparatus for testing an optical system, the apparatus comprising:
a light source for generating a measurement light beam; and
a combination detector for detecting at least one visually recognizable property and at least one optical property of an optical system, said the combination detector having:
an image sensor formed with a detection surface defining a first partial region and a second partial region;
a phase visualization element configured to convert an input light beam originating from the measurement light beam and impinging from a direction of incidence into one or more output light beams in which a spatial phase distribution of the input light beam is visually visible;
said phase visualization element being arranged relative to said detection surface of said image sensor in such a way that the one or more output light beams are incident only on said first partial region of said detection surface, while said second partial region of said detection surface is exposed toward the direction of incidence in order to detect the input light beam that is uninfluenced by said phase visualization element.

8. The apparatus according to claim 7, further comprising a sample holder for fixing the optical system to be tested, said sample holder being arranged in a beam path of the measurement light beam between said light source and said image sensor.

9. The apparatus according to claim 7, further comprising an optical element for matching optical path lengths of a part of the input light beam which impinges on said phase visualization element and a part of the input light beam which impinges on said second partial region of said detection surface.

10. The apparatus according to claim 7, which comprises:
an evaluation unit for evaluating an image of the optical system to be tested, wherein the image is recorded by the image sensor, the image has a first image region corresponding to said first partial region of said detection surface and a second image region corresponding to said second partial region of said detection surface;
said evaluation unit being configured to automatically ascertain at least one optical property of the optical system to be tested from the first image region; and/or
said evaluation unit being configured to automatically ascertain at least one visually recognizable property of the optical system to be tested from the second image region.

11. The apparatus according to claim 10, wherein said evaluation unit is configured to automatically recognize and segment the first image region and the second image region in the image.

12. The apparatus according to claim 7, configured for testing contact lenses or intraocular lenses being the optical system to be tested.

13. A method for detecting at least one visually recognizable property and at least one optical property of an optical system, the method comprising:
providing a combination detector having,
an image sensor having a detection surface with a first partial region and a second partial region,
a phase visualization element configured to convert an input light beam impinging from a direction of incidence into one or more output light beams in which a spatial phase distribution of the input light beam is visually visible, and
the phase visualization element being arranged relative to the detection surface of the image sensor in such a way that the one or more output light beams are incident only on the first partial region of the detection surface, while the second partial region of the detection surface is exposed toward the direction of incidence in order to detect the input light beam that is uninfluenced by the phase visualization element generating a first partial image by the image sensor and the phase visualization element, the first partial image rendering visually recognizable a spatial phase distribution of a measurement light beam influenced by the optical system to be tested;
generating a second partial image containing an imaging or projection of a part of the optical system to be tested by the image sensor;
ascertaining at least one optical property from the first partial image; and
ascertaining at least one visually recognizable property from the second partial image.

* * * * *